(12) United States Patent
Ye

(10) Patent No.: US 10,046,621 B2
(45) Date of Patent: Aug. 14, 2018

(54) GOLF CART WINDSHIELD

(71) Applicant: Chongqing Richland Mold Corp., Chongqing (CN)

(72) Inventor: Lin Ye, Chongqing (CN)

(73) Assignee: CHONGQING RICHLAND MOLD CORP., Chongqing (CN)

(*) Notice: Subject to any disclaimer, the term of this patent is extended or adjusted under 35 U.S.C. 154(b) by 0 days.

(21) Appl. No.: 15/630,937

(22) Filed: Jun. 22, 2017

(65) Prior Publication Data

US 2018/0043755 A1   Feb. 15, 2018

(30) Foreign Application Priority Data

Aug. 12, 2016 (CN) .................... 2016 2 0875368 U

(51) Int. Cl.
*B60J 1/02* (2006.01)
*B60J 1/06* (2006.01)
*B60J 1/20* (2006.01)
*B60J 1/00* (2006.01)

(52) U.S. Cl.
CPC ................. *B60J 1/06* (2013.01); *B60J 1/008* (2013.01); *B60J 1/02* (2013.01); *B60J 1/2097* (2013.01)

(58) Field of Classification Search
CPC ....... B60J 1/008; B60J 1/06; B60J 1/02; B60J 1/2097
USPC ............................. 296/84.1, 89, 87, 92, 93
See application file for complete search history.

(56) References Cited

U.S. PATENT DOCUMENTS

| | | | | |
|---|---|---|---|---|
| 5,192,109 A | * | 3/1993 | Roberts | B60J 1/06 280/DIG. 5 |
| 5,195,797 A | * | 3/1993 | Hobbs | B60J 1/04 280/DIG. 5 |
| 5,264,270 A | * | 11/1993 | Agrawal | B29C 37/0032 277/642 |
| 5,385,379 A | * | 1/1995 | Heavner | B60J 1/04 280/DIG. 5 |
| 5,385,380 A | * | 1/1995 | Heavner | B60J 1/04 280/DIG. 5 |
| 5,791,720 A | * | 8/1998 | Moore | B60J 1/06 24/336 |
| 6,663,158 B1 | * | 12/2003 | Showalter | B60J 1/02 280/DIG. 5 |
| 7,267,388 B2 | * | 9/2007 | Hanson, Jr. | B60J 1/06 296/77.1 |
| 7,311,347 B1 | * | 12/2007 | Aller | B60J 1/06 296/77.1 |
| 7,390,051 B2 | * | 6/2008 | Bruntz | B60J 1/06 296/146.16 |

(Continued)

*Primary Examiner* — Gregory A Blankenship
(74) *Attorney, Agent, or Firm* — Cheng-Ju Chiang

(57) ABSTRACT

The present invention discloses a golf cart windshield including an upper panel having a bend, a lower panel having a bend, and a connecting bar. The connecting bar includes two grooves in which the bends of the upper and lower panels can be clamped respectively. In the present invention, by inserting the bend of the upper panel into one of the grooves of the connecting bar and inserting the bend of the lower panel into the other one of the grooves of the connecting bar, the upper and lower panels are connected by the connecting bar. The installation is convenient, the fixing is stable, and there is no need for glues or screws. In addition, the golf cart windshield does not easily fall off even under strong vibrations.

8 Claims, 10 Drawing Sheets

(56) References Cited

U.S. PATENT DOCUMENTS

| | | | | |
|---|---|---|---|---|
| 7,665,792 B1* | 2/2010 | Flynn | ................ | B60J 1/06 |
| | | | | 296/84.1 |
| 7,673,923 B2* | 3/2010 | Reese | ................ | B60J 1/06 |
| | | | | 296/84.1 |
| 2006/0249976 A1* | 11/2006 | Hanson | ................ | B60J 1/06 |
| | | | | 296/77.1 |
| 2008/0303308 A1* | 12/2008 | Hanson | ................ | B60J 1/06 |
| | | | | 296/146.16 |
| 2009/0230714 A1* | 9/2009 | Reese | ................ | B60J 1/06 |
| | | | | 296/92 |
| 2009/0278373 A1* | 11/2009 | Rouzer | ................ | B60J 1/06 |
| | | | | 296/92 |
| 2011/0001331 A1* | 1/2011 | Hirneise | ................ | B60J 1/06 |
| | | | | 296/87 |
| 2015/0043051 A1* | 2/2015 | Woodrow | ................ | B60J 3/04 |
| | | | | 359/241 |
| 2016/0318376 A1* | 11/2016 | Martin | ................ | B60J 1/06 |
| 2017/0282691 A1* | 10/2017 | Woodrow | ................ | B60J 3/04 |

\* cited by examiner

GOLF CART WINDSHIELD

TECHNICAL FIELD

The present invention relates to a windshield, and particularly to a golf cart windshield.

BACKGROUND

Currently, the upper and lower panels of a golf cart windshield are generally overlapped to allow wind to enter the golf cart from the front side. However, the upper and lower panels of many other golf cart windshields are connected by gluing, and can easily fall off during strong vibrations.

SUMMARY

The present invention provides a golf cart windshield whose upper and lower panels cannot easily fall off after connection.

The technical solutions of the present invention are as below. A golf cart windshield includes an upper panel having a bend, a lower panel having a bend, and a connecting bar, wherein the connecting bar includes two grooves in which the bends of the upper and lower panels can be clamped respectively.

In the present invention, by inserting the bend of the upper panel into one of the grooves of the connecting bar and inserting the bend of the lower panel into the other one of the grooves of the connecting bar, the upper and lower panels are connected by the connecting bar. The installation is convenient, the fixing is stable, and there is no need for glues or screws. In addition, the golf cart windshield does not easily fall off even under strong vibrations, and therefore can be applied widely.

Further, the connecting bar includes a symmetry line about which the two grooves are symmetrical and along which the connecting bar can be folded.

Further, the bends of the upper and lower panels are provided with limiting ends respectively.

Further, the upper panel is provided with a pair of corresponding lateral clamps.

Further, the two sides of the lower panel are provided with clips respectively.

Further, the lower panel is provided with a pair of corresponding front rubber strips.

Further, the upper panel is provided with a pair of corresponding silica gel cushions.

Further, the lower panel is provided with a pair of corresponding installation bolts.

DETAILED DESCRIPTION

The followings will further describe the present invention with reference to the drawings.

Figure 9:
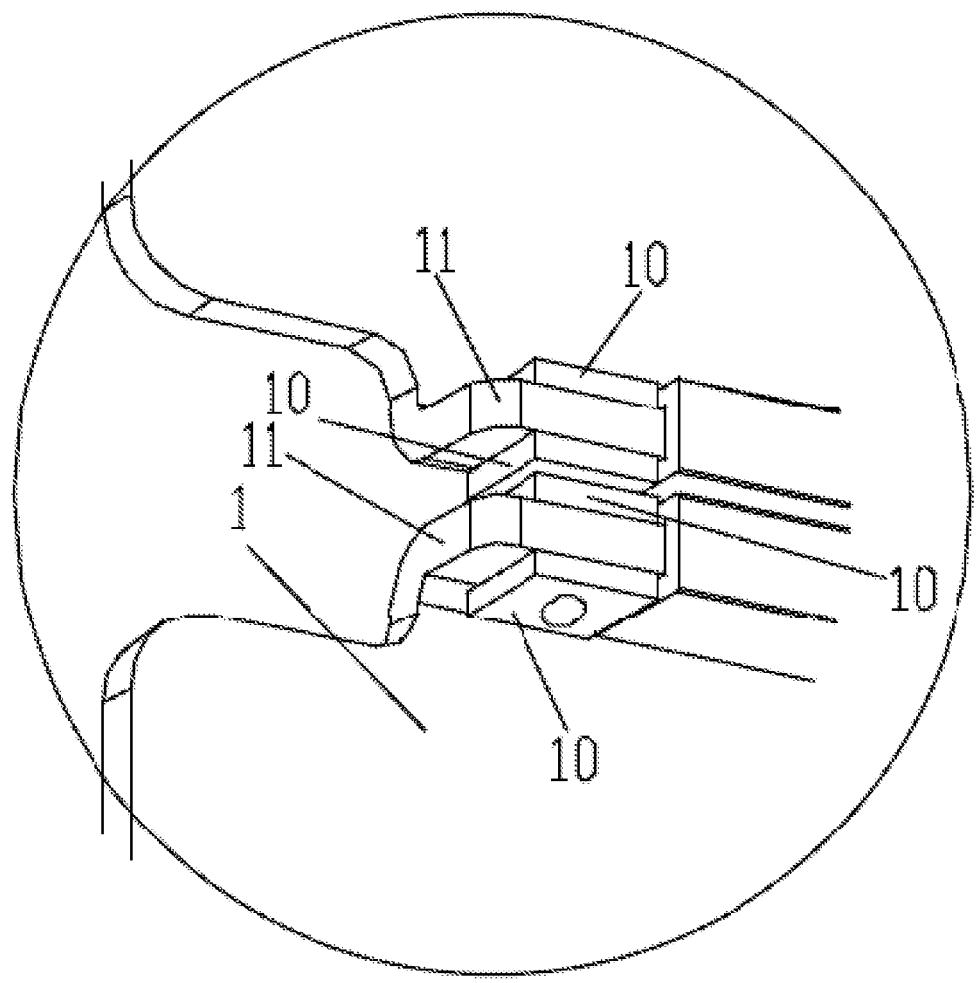
FIG. 9 is a schematic view of the upper panel of the present invention.

As shown in FIGS. 1 to 3 and FIG. 5, the present invention provides a golf cart windshield comprising an upper panel 1 having a bend, a lower panel 2 having a bend, and a connecting bar 4, wherein the connecting bar 4 includes two grooves in which the bends of the upper and lower panels 1, 2 can be clamped respectively. Specifically, referring to FIG. 9, two ends of a bend 11 of the upper panel 1 are provided with two stop blocks 10 respectively. The middle part of the stop block 10 is provided with a through hole. The two ends of the bend 11 of the upper panel 1 are provided with through holes penetrating the upper panel 1 respectively. Upon installation, the two stop blocks 10 are placed at the bends of the upper panel 1 respectively, and a bolt sequentially passes through the through hole of one of the stop blocks 10, the through hole at the bend 11 of the upper panel 1 and the through hole of the other stop block 10. Thus, the stop block 10 and the upper panel 1 are fixed relative to each other. Similarly, the two ends of the bend of the lower panel 2 are fixed to the stop block in the same way, which will not be repeated. The stop blocks 10 are used to limit the bends of the upper and lower panels 1, 2 clamped in the grooves of the connecting bar 4.

In the present invention, by inserting the bend of the upper panel into one of the grooves of the connecting bar and inserting the bend of the lower panel into the other one of the grooves of the connecting bar, the upper and lower panels are connected by the connecting bar. The installation is convenient, the fixing is stable, and there is no need for glues or screws. In addition, the golf cart windshield does not easily fall off even under strong vibrations, and therefore can be applied widely.

Figure 3:
FIG. 3 shows the state of the connecting bar after the golf cart windshield of the present invention is folded.
Figure 4:
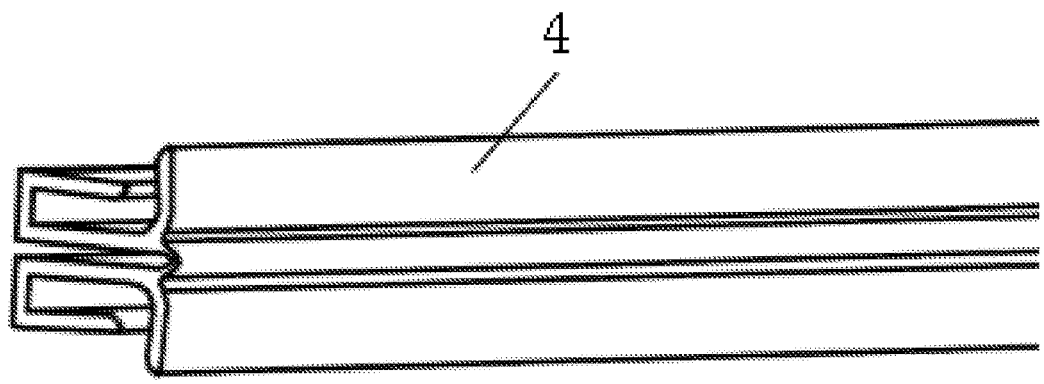
FIG. 4 shows the natural state of the connecting bar of the present invention is folded.
Figure 5:
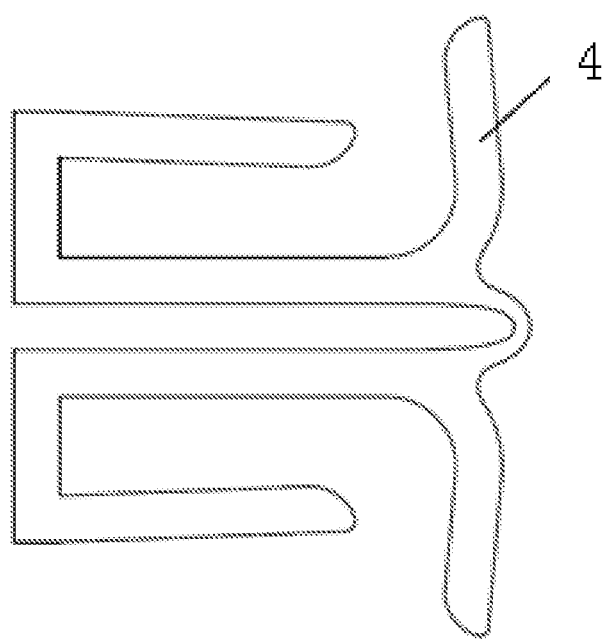
FIG. 5 shows the cross-section of the connecting bar of the present invention is folded.

As shown in FIGS. 3-4, as another embodiment, the connecting bar 4 includes a symmetry line about which the two grooves are symmetrical and along which the connecting bar 4 can be folded. The upper panel 1 and the lower panel 2 can be overlapped with each other along the symmetry line after being connected by the connecting bar 4.

Figure 6:
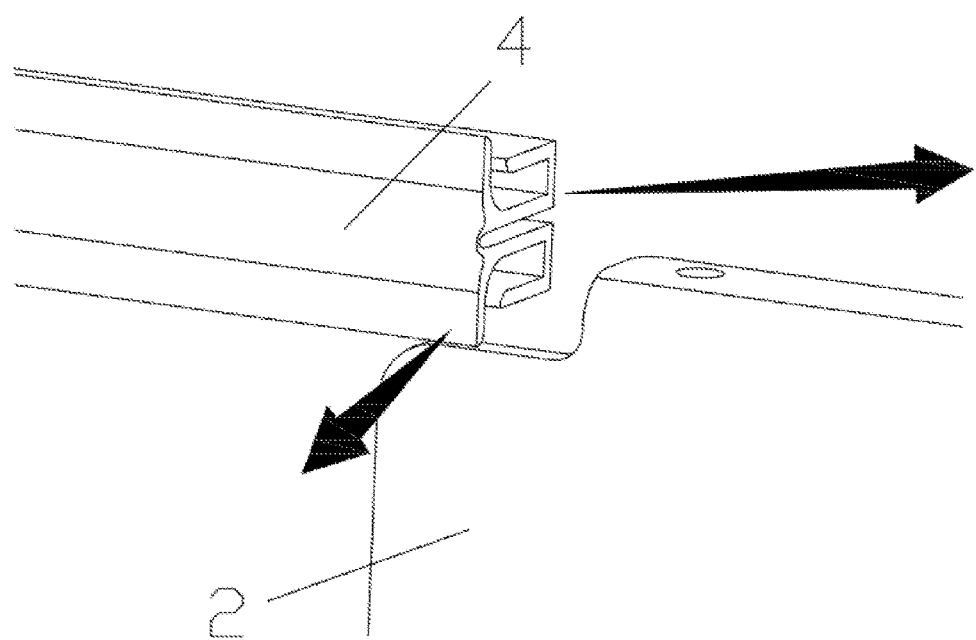
FIG. 6 is a view in which the connecting bar of the present invention is about to be installed to the lower panel.
Figure 7:
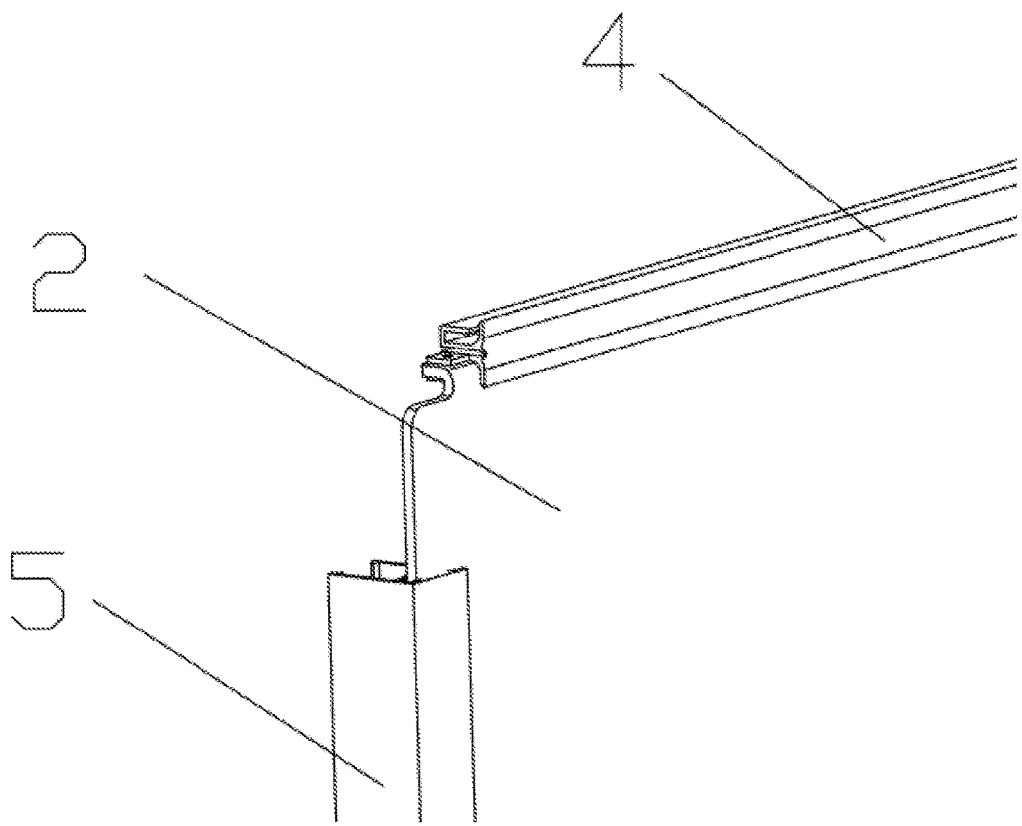
FIG. 7 is a view in which the connecting bar of the present invention is completely installed to the lower panel.
Figure 8:
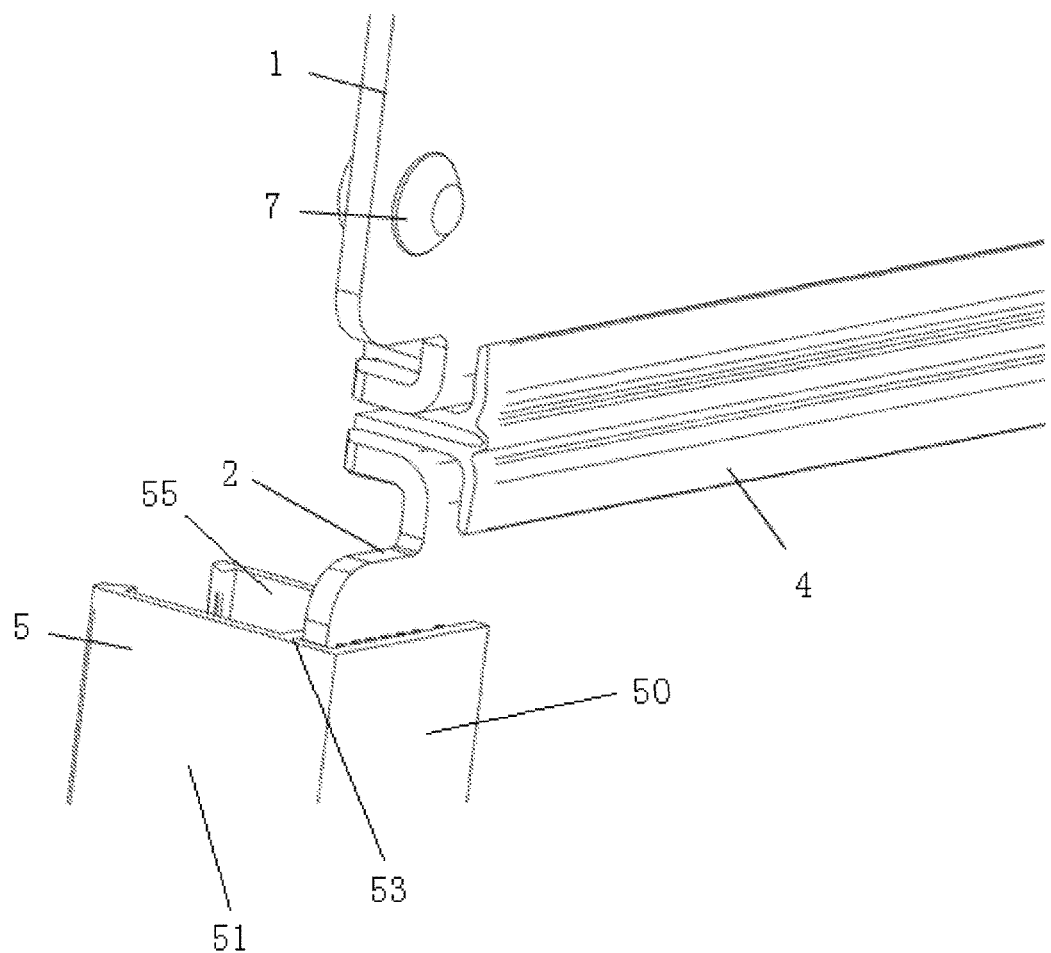
FIG. 8 is a view in which the connecting bar of the present invention is installed to the upper and lower panels.

As shown in FIGS. 6-8, as yet another embodiment, the bends of the upper and lower panels 1, 2 are provided with limiting ends respectively. When the bends of the upper and lower panels 1, 2 are inserted into the grooves, the bends are clamped in the grooves by the limiting ends, preventing the upper and lower panels 1, 2 from slipping from the grooves.

Figure 1:
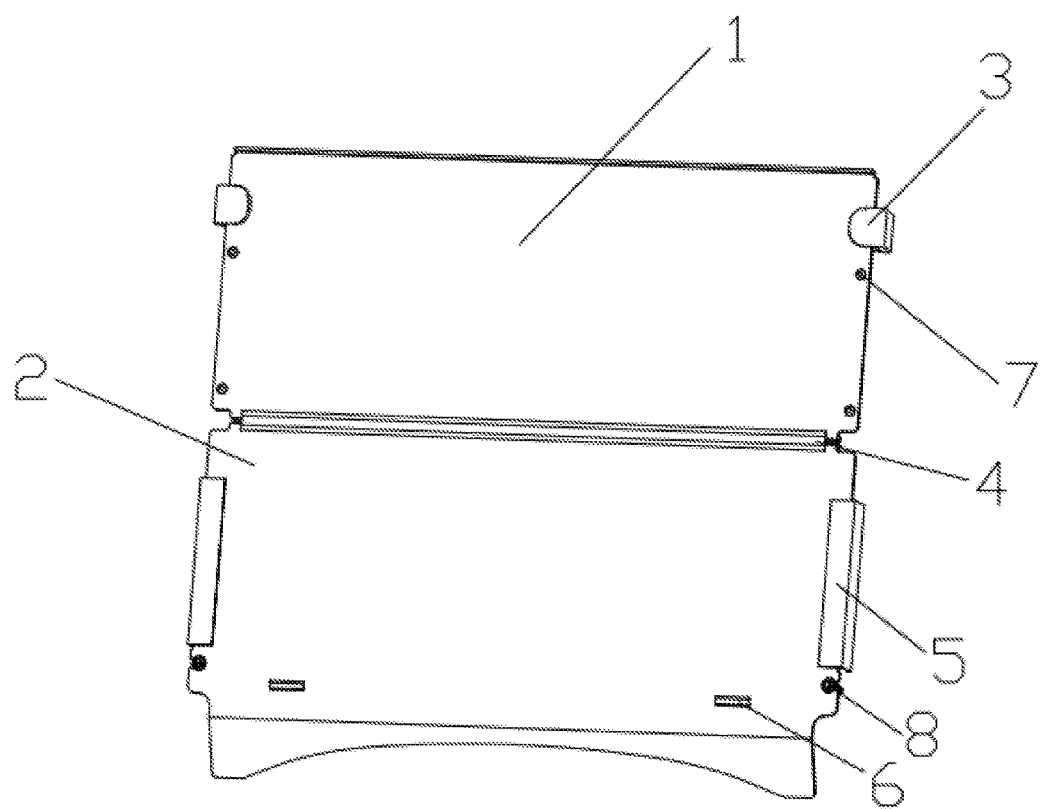
FIG. 1 is a view of the golf cart windshield of the present invention.
Figure 2:
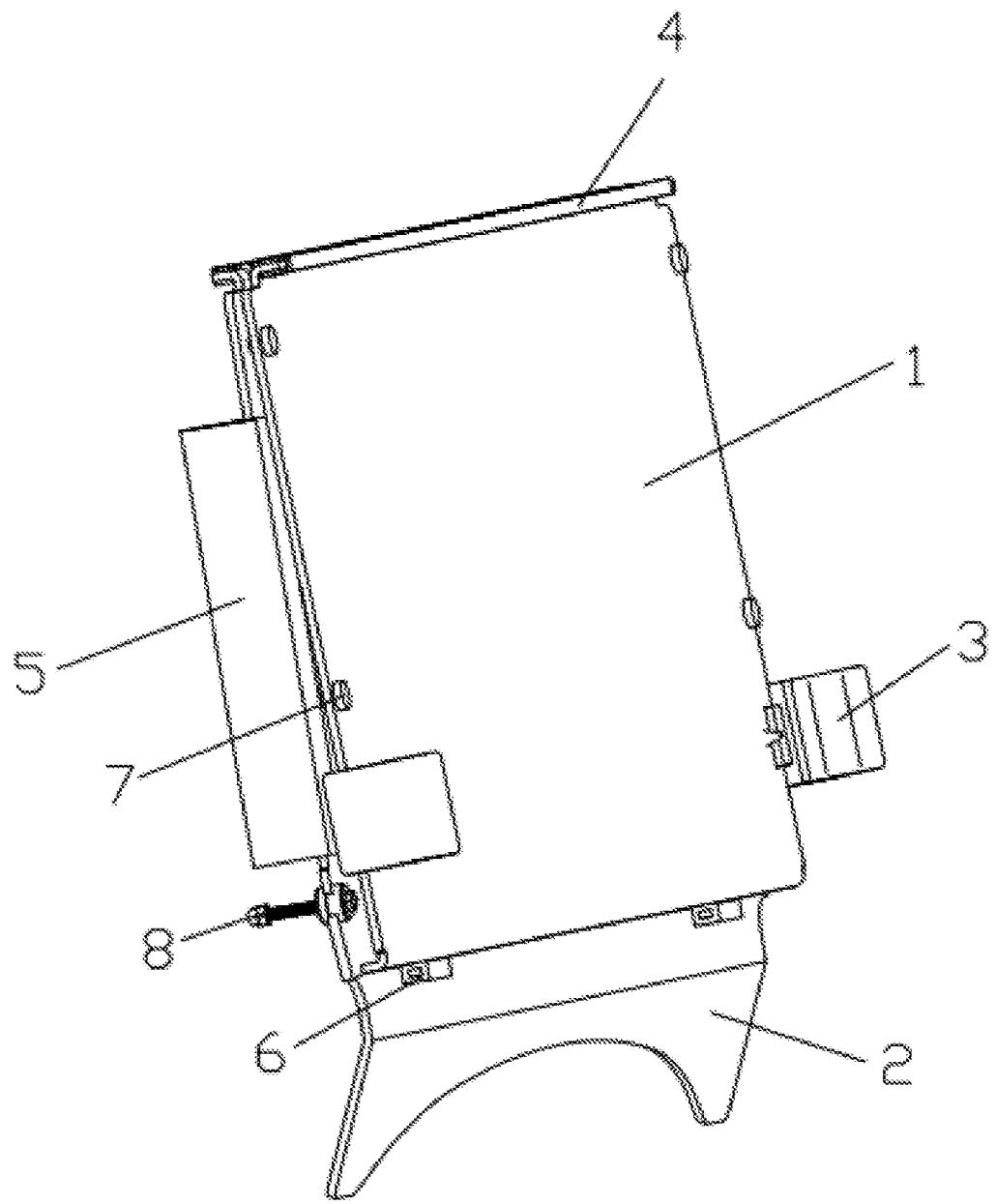
FIG. 2 is a view of a folded golf cart windshield of the present invention.

As shown in FIG. 1, as yet another embodiment, the upper panel 1 is provided with a pair of corresponding lateral clamps 3.

As shown in FIG. 1, as yet another embodiment, the two sides of the lower panel 2 are provided with clips 5 respectively, which respectively connect the pillars at the two sides of the golf cart windshield. Specifically, referring to FIG. 8, the clip 5 includes a first panel body 50, a second panel body 51, a third panel body 53, and a fourth panel body 55; the first to third panel bodies are connected to present an "F" shape. One end of the third panel body 53 not connected with the second panel body 51 is perpendicularly connected to the fourth panel body 55. One end of the second panel body 51 not connected with the first panel body 50 is provided with a barb facing the fourth panel body 55. One end of the fourth panel body 55 not connected with the third panel body 53 is provided with a barb facing the second panel body 51.

Figure 10:
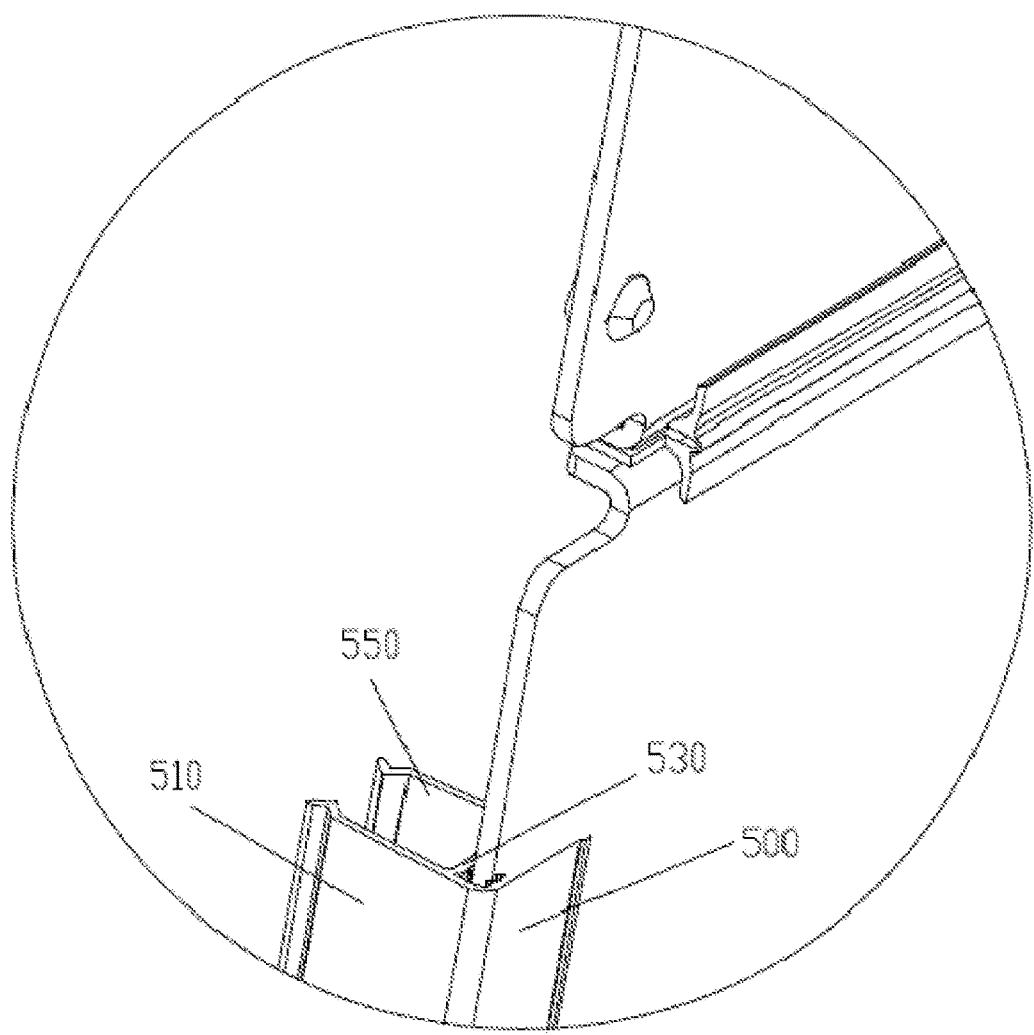
FIG. 10 is a schematic view of the clip of another embodiment of the present invention.

In yet another embodiment, referring to FIG. 10, one end of the second panel body 510 not connected with the first panel body 500 is provided with a "V" barb. One end of the fourth panel body 550 not connected with the third panel body 530 is provided with a "V" barb.

As shown in FIG. 1, as yet another embodiment, the lower panel 2 is provided with a pair of corresponding front rubber strips 6.

As shown in FIG. 1, as yet another embodiment, as the upper and lower panels 1, 2 may need to be folded sometimes, the upper panel 1 is provided with a pair of corresponding silica gel cushions 7, which prevent direct contact between the upper and lower panels 1, 2.

As shown in FIG. 1, as yet another embodiment, the lower panel 2 is provided with a pair of corresponding installation bolts 8 for installing the lower panel 2 to the golf cart.

The above embodiments of the present utility model are illustrated by way of example, and are not intended to limit the patent scope of the present utility model. Equivalent structures made using the description and drawings of the present utility model and applied to other related technical fields directly or indirectly shall fall into the patent protection scope of the present utility model.

What is claimed is:

1. A golf cart windshield, comprising: an upper panel having a bend, a lower panel having a bend, and a connecting bar, wherein the connecting bar comprises two grooves in which the bends of the upper and lower panels can be clamped respectively, the connecting bar further comprises a symmetry line about which the two grooves are symmetrical and along which the connecting bar can be folded, the bends of the upper and lower panels are provided with two stop blocks respectively.

2. The golf cart windshield according to claim 1, wherein the upper panel is provided with a pair of corresponding lateral clamps.

3. The golf cart windshield according to claim 1, wherein the two sides of the lower panel are provided with clips respectively.

4. The golf cart windshield according to claim 1, wherein the lower panel is provided with a pair of corresponding front rubber strips.

5. The golf cart windshield according to claim 1, wherein the upper panel is provided with a pair of corresponding silica gel cushions.

6. The golf cart windshield according to claim 1, wherein the lower panel is provided with a pair of corresponding installation bolts.

7. The golf cart windshield according to claim 3, wherein the clip comprises a first panel body, a second panel body, a third panel body, and a fourth panel body; the first to third panel bodies are connected to present an "F" shape; one end of the third panel body not connected with the second panel body is perpendicularly connected to the fourth panel body; one end of the second panel body not connected with the first panel body is provided with a barb facing the fourth panel body; and one end of the fourth panel body not connected with the third panel body is provided with a barb facing the second panel body.

8. The golf cart windshield according to claim 3, wherein the clip comprises a first panel body, a second panel body, a third panel body and a fourth panel body; the first to third panel bodies are connected to present an "F" shape; one end of the third panel body not connected with the second panel body is perpendicularly connected to the fourth panel body; one end of the second panel body not connected with the first panel body is provided with a "V" barb; and one end of the fourth panel body not connected with the third panel body is provided with a "V" barb.

\* \* \* \* \*